United States Patent [19]

Schlamann et al.

[11] 4,235,315
[45] Nov. 25, 1980

[54] FULL DISK BRAKE

[75] Inventors: Wilhelm Schlamann, Isernhagen; Joachim Feldmann, Neustadt; Erich Reinecke, Beinhorn, all of Fed. Rep. of Germany

[73] Assignee: WABCO Fahrzeugbremsen GmbH, Hanover, Fed. Rep. of Germany

[21] Appl. No.: 928,931

[22] Filed: Jul. 28, 1978

[51] Int. Cl.$^3$ ............................................. F16D 69/04
[52] U.S. Cl. ................................. 188/73.6; 188/71.4
[58] Field of Search ................... 188/71.4, 71.5, 73.6; 192/70

[56] References Cited

U.S. PATENT DOCUMENTS

| | | | |
|---|---|---|---|
| 3,124,216 | 3/1964 | Buyze | 188/71.4 |
| 3,696,900 | 10/1972 | Montalvo | 188/73.6 X |
| 3,889,784 | 6/1975 | Hanks | 188/71.4 |
| 3,942,610 | 3/1976 | Klaue | 188/71.4 |

*Primary Examiner*—Duane A. Reger
*Attorney, Agent, or Firm*—R. S. Visk; R. W. McIntire, Jr.

[57] ABSTRACT

A full disk brake including a pair of disks, brake pads, and a closed external housing. In order to facilitate removal of the housing for changing brake pads, the housing is segmented, such as in the form of a pair of semi-cylindrical segments which are secured to the respective peripheries of oppositely facing disks. The housing segments may be removed independently of the brake actuating mechanism, that is, the wheel cylinder, to permit the pads to be changed. The housing segments may also be mounted such that they may be partially unsecured and then swung out of the way of access to the brake pads.

4 Claims, 9 Drawing Figures

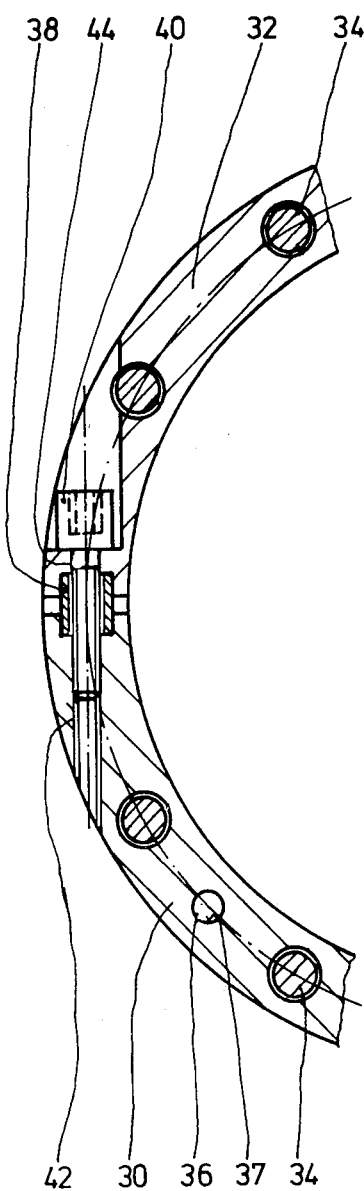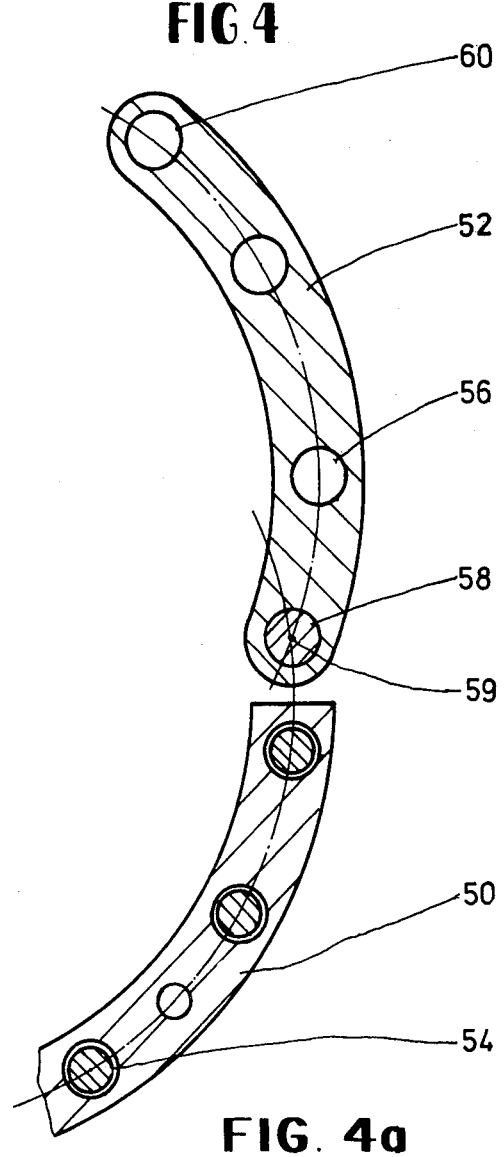

FULL DISK BRAKE

BACKGROUND OF THE INVENTION

In previously-known full disk brakes it is felt to be a disadvantage that in order to effect a change of the brake pads, the housing must be opened and at least partially disassembled and frequently the actuating element must be removed.

It has also been suggested to provide openings in the housing, through which the pads can be changed. This type of construction does allow a very easy and rapid change of pads, but it has the disadvantage that the rigidity and strength of the brake housing is reduced. Therefore, it cannot be used with extreme loads. Furthermore, the full surface of the pads cannot be utilized.

Solutions are also known in which the housing consists of two parts held together by bolts or by a clamping band. If the connection is loosened, the two halves of the housing can be slid apart and the pads can be changed. This form of construction can only be used, however, when there is sufficient space on both sides of the disk brake. As a rule though, this space is not available, especially on the front axle of a vehicle because of the arrangement of the axle journal.

SUMMARY OF THE INVENTION

The task of the present invention therefore consists in developing a full disk brake of the type named initially in such a way that, in spite of easy changeability of the brake pads, the full rigidity and strength of the brake housing is maintained, and such that additional space for changing the pads is not required.

This task is accomplished according to the invention in that the jacket or housing is designed to be detachable between the brake disks.

By means of the solution according to the invention, a brake-pad change is possible with no disassembly of the actuating unit or of the brake clamping mechanism. The brake disks can remain in their operating position, which is especially important with regard to space requirements.

For easier manipulation at brake-pad change, the jacket consists of several parts designed to be detached individually or as a group.

In accordance with another practical refinement of the invention, the parts are designed to be assembled or disassembled by segments which are so designed as to be orientable. By this means, the change and, especially, the assembly is facilitated, and one avoids the danger of losing or misplacing of parts of the jacket. Heavy parts no longer need to be transported, thus improving the entire operation.

The jacket or jacket parts or segments are detachably mounted on the brake disks by means of mounting screws.

In accordance with a further refinement of the invention and for the purpose of assuring the locking of the position of the brake disks and the jacket parts with respect to each other after loosening the mounting screws, pins or bolts are provided in the brake disks that engage in holes in the parts or segments of the jacket and which are not removed or reoriented during brake-pad change.

For the simplification of the alignment or orientation of the removable parts with the parts of the jacket that remain connected to the brake disk on pins, centering elements are provided.

These centering elements are arranged in the contact surfaces of the jacket parts, where, in accordance with an advantageous refinement of the invention, the centering element consists of a bushing and a screw arranged in holes that tangentially penetrate the jacket parts on the contact surfaces.

In order to avoid displacement of the orientable parts of the jacket, the latter are fixed by means of tight-fit screws.

Moreover, in order to avoid the possibility of imbalances as a result of displacements of the individual disk-brake parts with respect to each other when the brake-pads are changed, expansion screws are provided that are arranged in one brake disk so as to be rotatable, and by the tightening of which, after removal of the mounting screws and loosening of the tight-fit screws of only the detachable parts of the jacket, the brake disks may be spread apart sufficiently to permit the jacket parts to be moved aside or removed so that the brake-pad supports can be exposed or removed.

If sufficient space is available, the jacket can be one piece and can be designed to be removed as a unit.

BRIEF DESCRIPTION OF THE DRAWINGS

In the drawings:

FIG. 3 is a transverse fragmentary view of a disk brake showing a modification of the invention;

FIG. 4 and 4a show a further modification of the invention as shown in FIG. 3;

DESCRIPTION AND OPERATION

Figure 1:
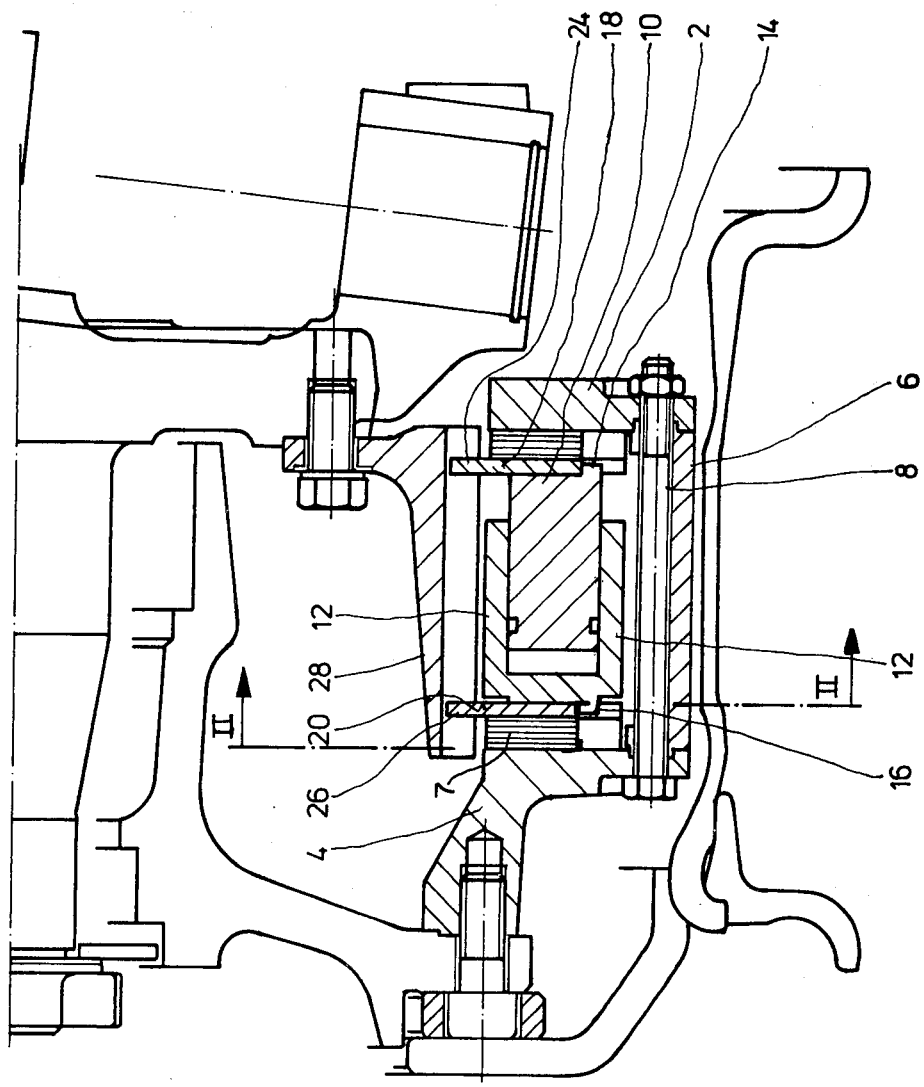
FIG. 1 is an axially oriented, elevational fragmentary section of a disk brake embodying the invention.
Figure 2:
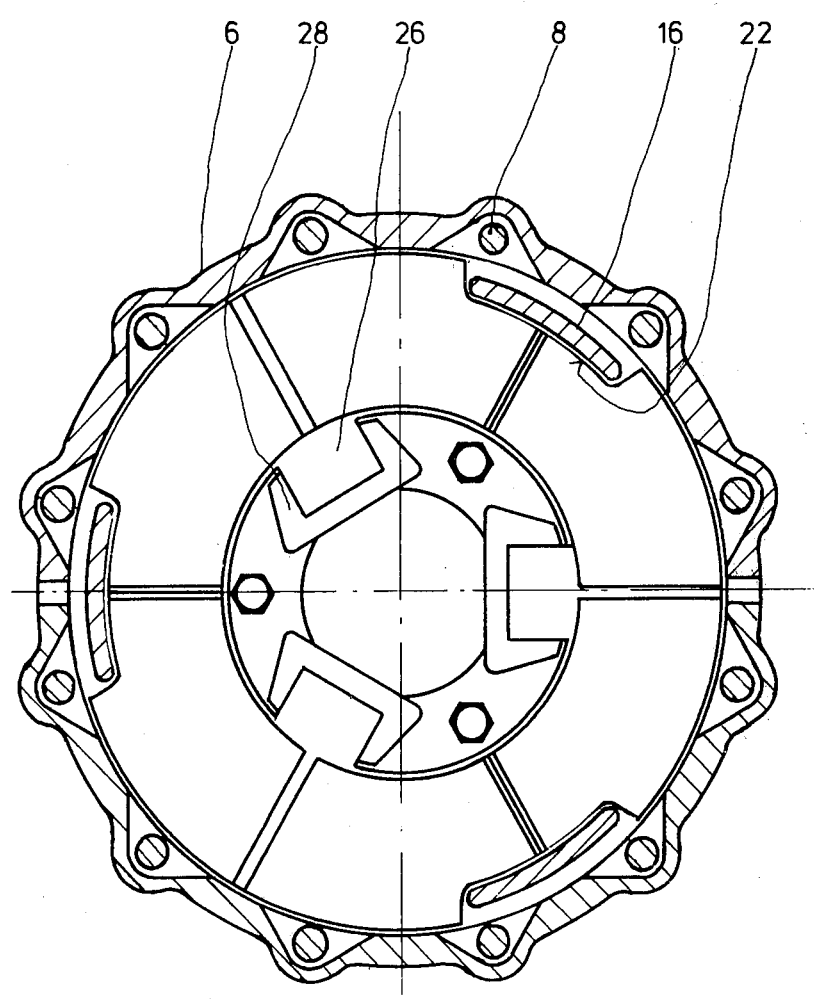
FIG. 2 is a transverse sectional view taken along line II—II of FIG. 1 as viewed in the direction of the arrows.

Reference is made first to FIGS. 1 and 2, which show two sections of one form of execution of the full disk brake according to the invention. The disk brake according to FIGS. 1 and 2 has a housing utilizing two oppositely facing brake disks 2 and 4 to form a part thereof, and assembly parts 6 in the form of a split housing cylinder which comprises a plurality of arcuate cylindrical segments. The parts 2, 4, and 6 of the housing are held together by mounting screws 8. To change brake pads 7, the mounting screws 8 are removed, the assembly parts 6 are removed toward the outside, and a clamping device, consisting essentially of a piston 10 and a cylinder 12, is compressed to the extent of an undercut 14 on piston 10 or of an undercut 16 on cylinder 12, by means of which actions brake-pad supports 18 and 20, of two or more parts, are exposed and can be changed without any appreciable shifting of the remaining brake disks 2 and 4 in an axial direction being required. As can be seen in FIG. 2, each of the brake-pad supports 18 and 20 in the present example of execution consist of three parts 19 having cutouts 22 that lock with the undercuts 16, which here have the form of projecting lugs. The brake-pad supports 18 and 20 have extensions 24 and 26 with which they engage U-shaped extensions 28 on the axle tube.

FIG. 3 shows another form of execution of the disk brake according to the invention, in this case with a divided or two-part jacket 30, 32 corresponding to split cylinder 6 in FIG. 1. To change brake pads, mounting screws 34 are loosened; part 30, however, remains over pins or bolts 36 that are secured in the brake disks 2 and 4 (not shown in FIG. 3) and engage in corresponding holes 37 in jacket part 30, in connection with the brake disks. The brake-pad change is effected by lifting them out through the opening made by removal of part 32. After the pad change has been carried out, the correct position of the brake disks and the jacket parts with respect to each other is assured by first tightening the screws 34 of jacket part 30, then by fixing jacket part 32 over centering elements 38 and 40, only one of which is shown, but it being understood that another such centering element is located diametrally opposite to said first-mentioned one. Each centering element comprises a bushing 38 and a screw 40 that are arranged tangentially in corresponding holes 42, 44 of the jacket parts, and fastening it by means of the mounting screws 34 of jacket part 32. By means of this positioning of the parts with respect to each other, it is assured that the disassembly and subsequent assembly of the parts will cause no imbalances, which could have deleterious effects on the wheel bearings.

FIGS. 4 and 4a show a variant of the disk brake according to FIG. 3. Jacket part 50, as shown in FIG. 4a and which is not removed for a change of brake pads, is fastened between the brake disks (not shown in this view), in analogy with the form of execution according to FIG. 3. The centering elements, however, have been done away with. The removable jacket part 32 of FIG. 3 is replaced in the form of execution according to FIG. 4 with one or more jacket parts 52 that can be pivoted or swung aside. For a brake-pad change, just as in the form of execution according to FIG. 3, the mounting screws 54 in holes 56 of the jacket part remaining on the brake disk are loosened until free of brake disks 2 and 4, and tight-fit screws 58 in rotation centers 59 are loosened. Screws (not shown) disposed in holes 60 at the end of jacket part 52 opposite screws 58 are removed, whereupon said jacket part may be pivoted about loosened screws 58 to allow removal of the worn brake pads. Centering or positioning of jacket parts 50 and 52 on the assembly is effected with the aid of tight-fit screws 58 and of further tight-fit screws in holes 60 provided in the ends of the swingable parts of the jacket.

In the forms of execution according to FIGS. 3 and 4, to achieve optimum concentricity it is practical to produce the jacket parts in one piece as a circular ring and to divide them as desired in a subsequent operation.

Figure 5:
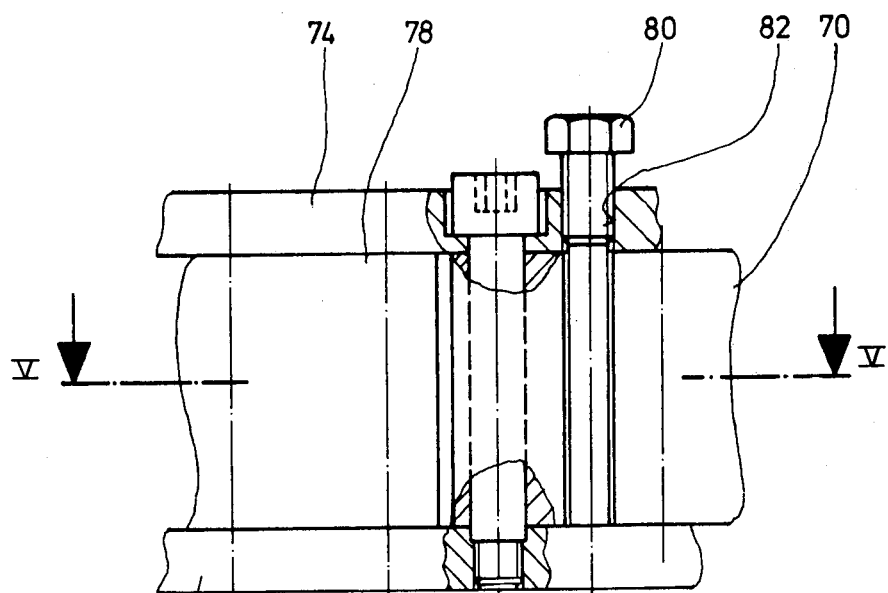
FIG. 5 is a fragmentary view showing still another modification of the invention.
Figure 5A:
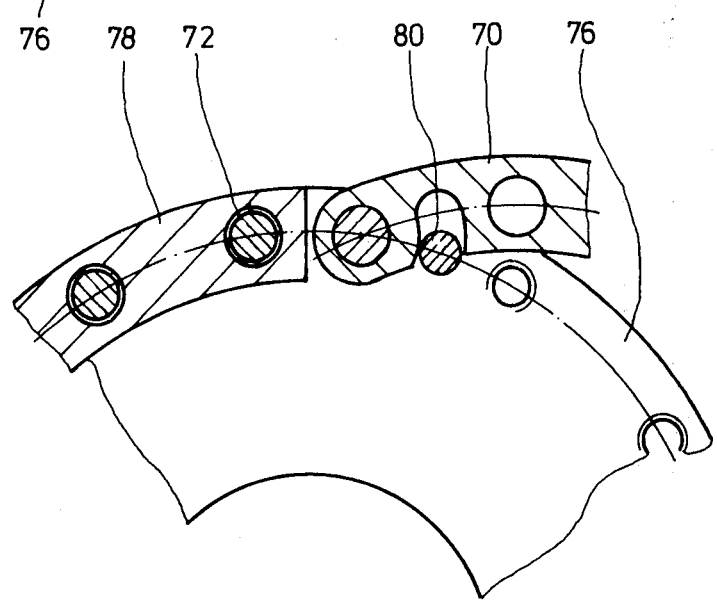
FIG. 5a is a fragmentary view taken along line V—V of FIG. 5 as viewed in the direction of the arrows.

In the form of execution of the full disk brake according to the invention represented in FIGS. 5 and 5a, a possibility is shown of carrying out the removal or swinging aside of jacket parts 70 required for changing brake pads without loosening the mounting screws 72 of the jacket parts 78 remaining on the brake disks 76. An expansion screw 80 is driven through the jacket part 70 to be opened and passes through a tapped hole 82 in the one brake disk and abuts against the inner face of the other brake disk 76. When the expansion screw is tightened, the brake disks 74 and 76 are spread apart, thus enabling the removal or swinging aside of the jacket 70.

Figure 6:
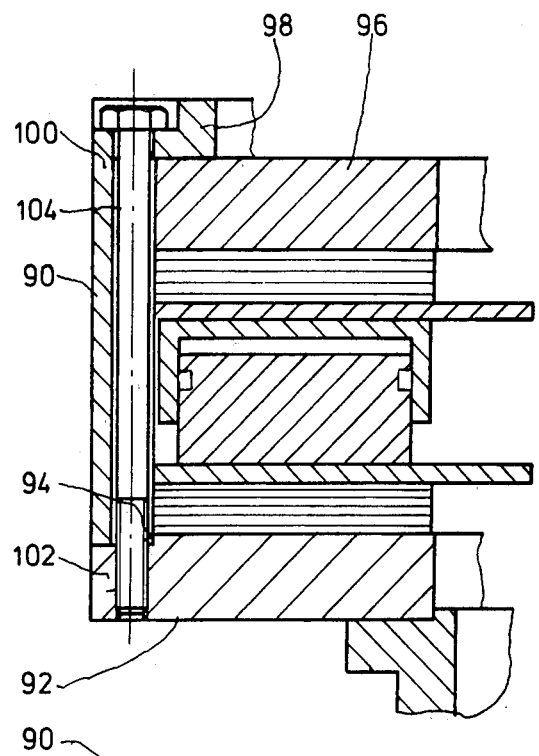
FIG. 6 is a fragmentary view of still a further modification of the invention.
Figure 6A:
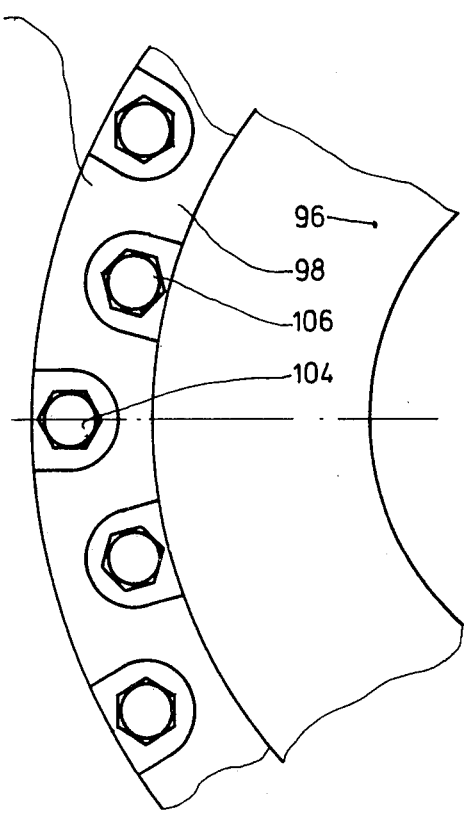
FIG. 6a is a fragmentary view of the modification shown in FIG. 6 as viewed from the left side thereof.

FIGS. 6 and 6a show another form of execution of the full disk brake according to the invention, in which a one-piece jacket 90 is provided. The jacket is situated with one end on the inner face of one brake disk 92 and is supported on a shoulder 94. The other brake disk 96 is engaged by a collar 98 formed on the jacket. Holes 100 are provided in the jacket 90, the prolongations of which correspond to tapped holes 102 in the brake disk 92, into which longer screws 104 can be screwed for the purpose of fastening the jacket 90 to the brake disk 92. For the attachment of the jacket 90 to the other brake disk 96, the collar 98 has holes (not represented) the prolongations of which match tapped holes (not represented) in the brake disk, into which shorter screws 106 (see FIG. 6a) can be driven. For a change of brake pads, screws 104 and 106 are loosened, and the jacket can then be removed from the brake disks in an axial direction (in FIG. 6a, up out of the plane of the drawing; in FIG. 6, toward the top). Assembly is effected correspondingly working backward.

We claim:

1. A full disk brake assembly provided with an external cylindrically contoured housing comprising a plurality of circumferentially disposed housing segments, each comprising a fixed section and a pivotable removable section with the removable sections being removably secured by mounting screws to and between adjacent peripheries of a pair of oppositely facing rotatable brake disks, a brake pad support fixed against rotation and comprising a plurality of arcuate segments disposed adjacent and spaced apart from each brake disk for carrying respective brake pads frictionally engageable with the brake disks, said removable sections of the housing segments being pivotable out of position to permit removal of the brake pad supports with the brake pads, and pins disposed in the brake disks such as to engage correspondingly formed holes in the fixed housing sections for locking the position of the brake disks and the housing segments relative to each other after loosening the mounting screws.

2. A full disk brake assembly provided with an external cylindrical housing comprising a plurality of circumferentially disposed housing segments, each comprising a fixed section and a pivotable removable section with the removable sections being removably secured by mounting screws to and between adjacent peripheries of a pair of oppositely facing rotatable brake disks and being fixed at their centers of rotation by means of tight-fit screws; a brake pad support fixed against rotation and comprising a plurality of arcuate segments disposed adjacent and spaced apart from each brake disk for carrying respective brake pads frictionally engageable with the brake disks, said removable sections of the housing segments being pivotable out of position to permit removal or the brake pad supports with the brake pads; pins disposed in the brake disks such as to engage correspondingly formed holes in the fixed housing sections for locking the position of the brake disks and the housing segments relative to each other after loosening the mounting screws; and expansion bolts operably disposed between the brake disks and rotatably carried on one brake disk, said expansion bolts being effective upon tightening thereof, after removal of the mounting screws and loosening of the tight-fit screws of only the removable housing sections, for causing the brake disks to be spread apart sufficiently that the removable housing section may be pivoted aside or removed and the brake pad supports be exposed and removed.

3. A full disk brake assembly according to claim 1, characterized in that for the purpose of the alignment of the removable housing sections with the fixed housing sections supported by said pins on the brake disks, centering elements, carried partly by the removable sections and partly by the fixed sections are provided.

4. A full disk brake assembly according to claim 3, characterized in that each centering element comprises a bushing and a screw disposed in axially aligned holes formed tangentially at the abutting ends of the housing segments.

* * * * *